Oct. 19, 1965     H. C. JOHNSTON     3,212,809
MANUFACTURE OF MOTOR VEHICLES FOR ADDITIONAL
PROTECTION FROM RADIATION HAZARDS
Filed Oct. 12, 1961
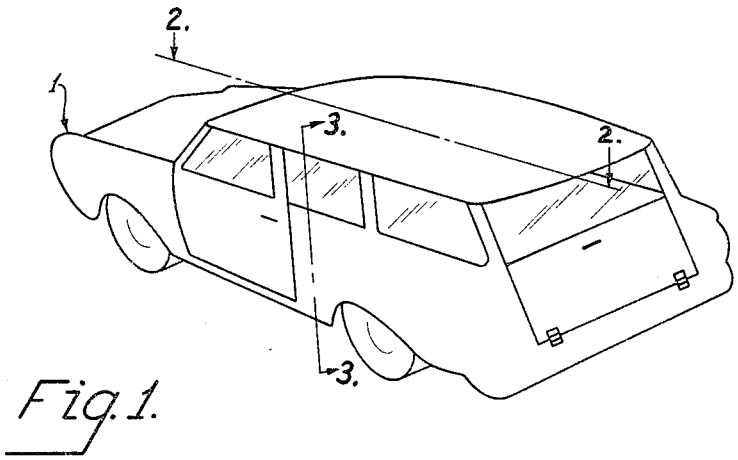
Fig. 1.
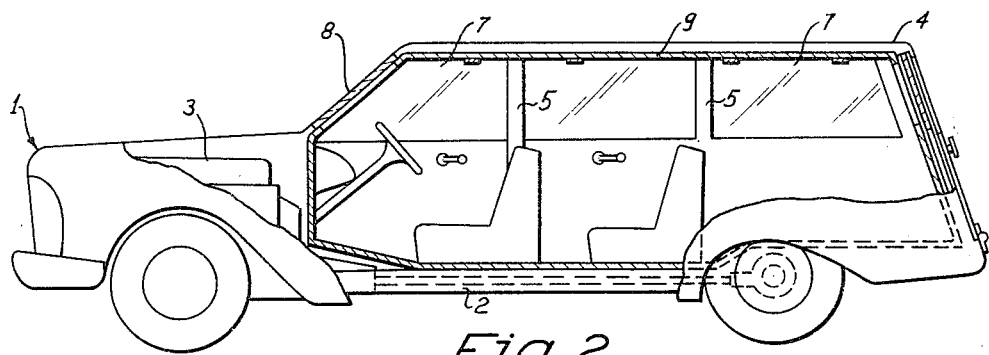
Fig. 2.
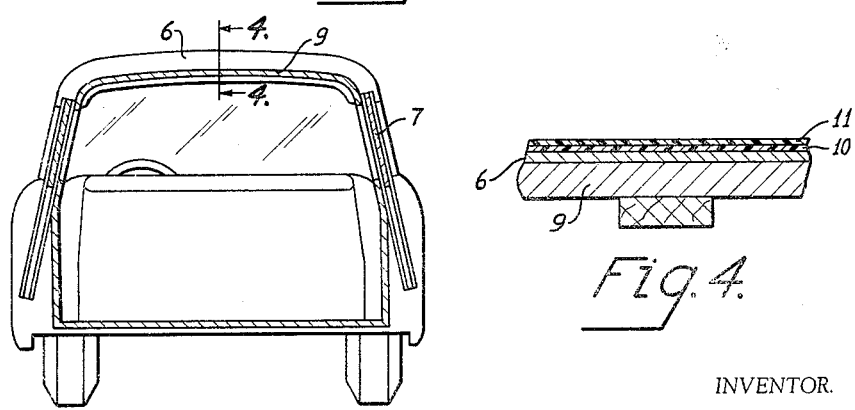
Fig. 3.
Fig. 4.
INVENTOR.
HERBERT C. JOHNSTON
BY
ATTORNEYS.

United States Patent Office 3,212,809
Patented Oct. 19, 1965

3,212,809
MANUFACTURE OF MOTOR VEHICLES FOR ADDITIONAL PROTECTION FROM RADIATION HAZARDS
Herbert Charles Johnston, P.O. Box 265, Gates Mills, Ohio
Filed Oct. 12, 1961, Ser. No. 147,698
4 Claims. (Cl. 296—1)

This invention relates to a self-propelled land vehicle so constructed as to afford the occupant or occupants substantial but not necessarily complete protection against radiation from early fall-out of the type produced by nuclear explosions.

There is at present an unsatisfied need for a selfpropelled land vehicle that can be used by civilian defense personnel in the discharge of assigned duties incident to emergencies such as those presented by an enemy attack using nuclear weapons. Such duties may involve, for example, bringing radiation and other casualties to medical centers affording better prospects for survival. In a vehicle used under such conditions, the driver and other occupants would, unless precautions are taken to prevent it, be exposed to radiation from early fall-out. This type of fall-out is generally acknowledged to be more dangerous than late fall-out; viz., fall-out making its appearance from a week to several weeks after the attack.

A principal object of the present invention is to provide a self-propelled land vehicle that may be used more or less freely during the period when early fall-out is present without needlessly exposing the driver and other occupants to radiation emanating from early fall-out. To this end, the invention provides a vehicle such as a station wagon wherein the body portion is characterized by the use of lead glass in the windows and windshield, by a sheathing of metallic lead of only moderate thickness, and by a protective coating of one or more layers of heavily pigmented paint, the latter preferably comprising at least one layer of lead paint and a surface layer of a light-colored reflective paint.

Where all of these features are present in combination, they can reduce exposure hazards appreciably. In the sense that the outer layer of reflective paint, inner layer or layers of lead paint, and sheating of metallic lead act in concert to reflect and/or attenuate radiation from early fall-out, a multiple benefit can be expected.

Other objects, advantages and features of the invention will be apparent from the description which follows and from the accompanying drawings, in which:

FIGURE 1 is a perspective of a station wagon constructed in accordance with the teachings of the invention, such figure serving to indicate the section lines for FIGURES 2 and 3.

FIGURE 2 is a vertical section taken longitudinally of the body shell of the vehicle: see line 2—2 of FIGURE 1.

FIGURE 3 is a transverse vertical section of such body shell: see line 3—3 of FIGURE 1.

FIGURE 4 is a fragmentary section, enlarged and not necessarily in correct proportion, on line 4—4 of FIGURE 3.

In FIGURES 1 and 2, the vehicle generally is designated 1. As is conventional in station wagons, it has a metal frame 2 supporting a gasoline engine 3 and a metal body shell 4. Body shell 4 has the usual spaced columns 5, four on each side, supporting roof panel 6. Windows 7, which are movable, and windshield 8, which is not, are all of lead glass of the type used in hospital X-ray rooms. Such glass is not readily distinguishable from commercial window glass by the ordinary person but is nevertheless capable of greatly attenuating and in fact virtually completely suppressing the transmission of rays of high penetrative power. Elsewhere body shell 4 is lined as shown with an internal sheathing 9 of sheet lead of moderate thickness.

As a general rule, the thickness of sheathing 9 should not be materially less than about 1/16 of an inch nor materially more than about 1/8 of an inch. Whereas a lead sheathing having a thickness substantially greater than 1/8 of an inch (e.g., two or three inches) would add inordinately to overall weight in any vehicle constructed largely along conventional passenger car lines, as is a station wagon, such a vehicle is able to carry the added weight imposed by a lead sheathing having a thickness up to about 1/8 inch. In protecting against radiation emanating from early fall-out, a lead sheathing measuring up to about 1/8 of an inch in thickness can be very valuable.

Lead sheathing 9 may be applied in any feasible way to body shell 4, normally in the form of sheet lead, being supported in the same manner and by the same means as roof panel 6. Elsewhere in the vehicle (as where sheathing 9 overlies the floor boards) it can be attached to the adjacent structure in any suitable fashion. In general, however, the sheathing should be solidly supported, should conform as closely as practicable to the interior shape of the body shell itself, and so far as possible should be free of structural crevices through which fall-out might find its way.

Illustrated in diagrammatic fashion in FIGURE 4, a particular feature of the invention is the use of a heavy-bodied lead paint, preferably a paint incorporating a much lead as lead oxide or metallic lead as the paint can accept in finely divided form. Advantageously, this layer of lead paint, indicated at 10 in FIGURE 4, may itself be coated with a surface layer 11 of a light-colored heavy-bodied reflective paint. Reflective paints of this kind are known and do not have to be described in detail to make possible an understanding of the invention. Usually, but not necessarily, they are white in color.

Where the major parts of the body shell are characterized both by an inside lining of sheet lead and an outside coating of heavy-bodied paint, as in top panel 6, the protective advantage accruing to the driver and other occupants of the vehicle is multiplied. There is some reason to believe that where, as in the preferred form of the present invention, plural layers of radiation-reflecting and radiation-attenuating materials are provided, the amount of radiation penetrating the interior of the body shell may be reduced on a non-arithmetic basis; that is to say, the reduction may be more than the arithmetic sum of any attenuation attributable solely to paint and any attenuation attributable solely to sheathing. Although this theory has yet to be established by conclusive experimentation, it is self-evident that multiple layers to afford multiple protection from fall-out deposited on the roof of the vehicle, where it is most likely to settle.

It is apparent that the inventive concept may be employed in other ways and that it may be used, for example, with vehicles of other types than station wagons, including trucks, trailers, sedans, coupes, etc. If, as in the case of a truck, available space permits of it, household appliances of types that can be operated from the electrical system of the vehicle may be mounted inside the vehicle body, this with the thought of making the vehicle a habitable place wherein occupants can dwell temporarily. Incidental features such as the use of gasoline tanks capable of holding several times as much as standard gasoline tanks may be included, if desired. Changes of other kinds may readily be made by those skilled in the automobile art.

It is intended that the patent shall cover, by sum-

What is claimed is:

1. A lead-lined motor vehicle the motility of which is not materially impaired by the weight of the lead lining comprising (a) a frame; (b) a prime mover supported by the frame; (c) a metal body on the outside face of which are (1) an inner layer of a radiation-attenuating coating composition and (2) an overlying outer layer of a radiation-reflective coating composition; (d) lead-glass windows in said body; and (e) a radiation-attenuating structural element within said body taking the form of a solid sheath of metallic lead carried by and lining the unglazed portions thereof from top to bottom, from side to side and from end to end, said sheath having a thickness great enough to temporarily provide substantial protection against harmful radiation from early fall-out of the type encountered following a nuclear explosion but not greater than about ⅛ inch.

2. A motor vehicle according to claim 1 wherein said inner or first-mentioned layer (1) comprises a heavy-bodied lead paint characterized by a particularly high lead content.

3. A motor vehicle according to claim 1 wherein said outer or last-mentioned layer (2) comprises a white-pigmented paint characterized by appreciable radiation-reflecting properties.

4. A motor vehicle according to claim 1 wherein the thickness of the lead sheath is not less than about ¹⁄₁₆ inch.

References Cited by the Examiner

UNITED STATES PATENTS

| | | | |
|---|---|---|---|
| 1,815,922 | 7/31 | Lapof | 250—108 |
| 1,854,942 | 4/32 | Lapof | 250—108 |
| 2,223,118 | 11/40 | Miller | 290—108 |
| 2,243,659 | 5/41 | Thompson | 296—23 |
| 2,743,955 | 5/56 | Wilson | 296—23 |
| 2,747,105 | 5/56 | Fitzgerald et al. | 109—1 |
| 3,113,089 | 12/63 | Nogey et al. | 250—108 X |

PHILIP ARNOLD, *Examiner.*

BENJAMIN HERSH, *Primary Examiner.*